(12) United States Patent
Kirsamer

(10) Patent No.: US 12,255,016 B2
(45) Date of Patent: Mar. 18, 2025

(54) MAGNETIC ACTUATOR, VALVE ARRANGEMENT AND METHOD

(71) Applicant: Festo SE & Co. KG, Esslingen (DE)

(72) Inventor: Uwe Kirsamer, Weilheim (DE)

(73) Assignee: Festo SE & Co. KG, Esslingen (DE)

( * ) Notice: Subject to any disclaimer, the term of this patent is extended or adjusted under 35 U.S.C. 154(b) by 85 days.

(21) Appl. No.: 18/094,489

(22) Filed: Jan. 9, 2023

(65) Prior Publication Data

US 2023/0223178 A1 Jul. 13, 2023

(30) Foreign Application Priority Data

Jan. 10, 2022 (DE) .................. 10 2022 200 152.4

(51) Int. Cl.
*H01F 7/06* (2006.01)
*F16K 31/06* (2006.01)

(52) U.S. Cl.
CPC ......... *H01F 7/064* (2013.01); *F16K 31/0675* (2013.01)

(58) Field of Classification Search
None
See application file for complete search history.

(56) References Cited

U.S. PATENT DOCUMENTS

| 4,361,164 | A * | 11/1982 | Sakakibara | ............... | H01F 7/13 |
| | | | | | 137/487.5 |
| 10,711,912 | B2 * | 7/2020 | Kanai | .................. | H01F 7/1844 |
| 11,137,137 | B2 * | 10/2021 | Abate | ..................... | F23N 1/002 |
| 11,236,841 | B2 * | 2/2022 | Krosschell | ........... | A01C 23/047 |
| 11,261,998 | B2 * | 3/2022 | Bodenschatz | ......... | H01F 7/1844 |
| 11,309,112 | B2 * | 4/2022 | Katagiri | ............... | F16K 31/0675 |
| 11,867,314 | B2 * | 1/2024 | Lesage | .................... | H01F 7/081 |
| 11,976,744 | B2 * | 5/2024 | Schrader | ............. | F16K 31/0679 |

FOREIGN PATENT DOCUMENTS

| DE | 39 10 810 | | 10/1990 | | |
| DE | 3910810 | A1 * | 10/1990 | ............... | H01F 7/18 |
| DE | 10 2006 009 628 | | 9/2007 | | |
| DE | 202 21 773 | | 9/2007 | | |
| DE | 20221773 | U1 * | 9/2007 | ............... | E21D 23/12 |
| DE | 102006009628 | A1 * | 9/2007 | ............. | F02D 41/20 |
| EA | 0 944 100 | | 9/1999 | | |
| EP | 0944100 | A1 * | 9/1999 | ............... | H01F 7/18 |
| JP | 63214585 | | 9/1988 | | |
| JP | 63214585 | A | 9/1988 | | |
| JP | S63214585 | * | 9/1988 | ............. | F16K 31/06 |

OTHER PUBLICATIONS

German Examination Report.

* cited by examiner

*Primary Examiner* — Matthew W Jellett
(74) *Attorney, Agent, or Firm* — Hoffmann & Baron, LLP

(57) ABSTRACT

A magnetic actuator having an actuator element, a coil for actuating the actuator element, and a circuit for energizing the coil, the circuit having a supply voltage input to which a supply voltage for energizing the coil is applicable, and the circuit being configured to provide a clocked energization of the coil in a holding current reduction phase and to adapt a duty cycle of the clocked energization as a function of the supply voltage.

16 Claims, 3 Drawing Sheets

MAGNETIC ACTUATOR, VALVE ARRANGEMENT AND METHOD

BACKGROUND OF THE INVENTION

The invention relates to a magnetic actuator having an actuator element, a coil for actuating the actuator element, and a circuit for energizing the coil, the circuit having a supply voltage input to which a supply voltage for energizing the coil is applicable, and the circuit being configured to provide a clocked energization of the coil in a holding current reduction phase. The wording "energizing the coil" shall mean "supplying current to the coil", and the term "energization of the coil" shall mean "supply of current to the coil".

For example, the holding current reduction phase may follow an attraction phase. In the attraction phase, the circuit energizes the coil strong enough to move the actuator element from a non-attracted position to an attracted position. The non-attracted position may in particular be referred to as non-picked-up position and the attracted position may in particular be referred to as picked-up position. In the holding current reduction phase, the actuator element is held in the attracted position, for which a lower current than in the attraction phase is sufficient.

To achieve a reduced coil current in the holding current reduction phase, the current can be clocked in the holding current reduction phase, for example on the basis of a PWM signal (PWM=pulse width modulation). There is the approach to operate the clocking without closed-loop control. This approach has the advantage that it is simple and space-efficient to implement, since no complex circuitry, in particular no microcontroller, is required for this approach. However, a disadvantage is that the holding current reduction without closed-loop control only works within a certain range of the supply voltage—and thus cannot be used flexibly. If the supply voltage is too low (for example, due to a long cable length), there is a risk that the clocked energization is not sufficient to hold the actuator element in the attracted position.

There is also the approach of performing a closed-loop current control during the clocked energization. In this approach, the current flowing through the coil is measured and the clocking of the energization is adjusted so that the measured current is equal to a target current value. The current flowing through the coil shall also be referred to as the coil current. This approach has the disadvantage that the closed-loop control typically requires a current sensing resistor, which requires additional space, so this approach is not easy or space efficient to implement.

SUMMARY OF THE INVENTION

It is an object of the invention to provide a circuit for the holding current reduction which circuit can be implemented simply and space-efficiently and which circuit allows flexible use of the magnetic actuator.

The object is solved by the magnetic actuator according to claim 1. The circuit of the magnetic actuator is configured to adapt a duty cycle of the clocked energization as a function of the supply voltage.

In particular, in the holding current reduction phase, the circuit maps the supply voltage to the duty cycle. Preferably, in the holding current reduction phase, the circuit adjusts the duty cycle by performing open-loop control (and in particular not closed-loop control) of the duty cycle based on the supply voltage. In particular, the circuit (especially in the holding current reduction phase) does not perform closed-loop control of the current flowing through the coil.

By adjusting the duty cycle as a function of the supply voltage, it becomes possible to compensate for the influence of changes in the supply voltage on the time average value of the coil current (and thus on the holding force with which the coil holds the actuator element in the attracted position). For example, a low supply voltage can be compensated by increasing the duty cycle of the energization. Due to the lower supply voltage, the current intensity is lower; however, the increased duty cycle means that the current is applied for a longer time (per energization period), so that a drop in the time average value of the coil current (which is decisive for the holding force) can be reduced or prevented. This means that the magnetic actuator can be operated over a wider range of the supply voltage and can therefore be used flexibly.

The adjustment of the duty cycle as a function of the supply voltage can be implemented without a microcontroller and preferably does not require any current measurement. The solution according to the invention can therefore be implemented simply and space-efficiently.

Advantageous further developments are defined in the dependent claims.

The invention further relates to a valve arrangement comprising the magnetic actuator, wherein the actuator element is implemented as a valve member or serves to actuate a valve member of the valve arrangement.

The invention further relates to a method of operating a magnetic actuator having an actuator element, a coil for actuating the actuator element, and a circuit for energizing the coil, the circuit having a supply voltage input, the method comprising the steps of:
  applying, to the supply voltage input, a supply voltage for energizing the coil,
  providing a clocked energization of the coil by means of the circuit in a holding current reduction phase, and
  adjusting a duty cycle of the clocked current as a function of the supply voltage by means of the circuit.

The method is preferably adapted in accordance with an embodiment of the magnetic actuator described above or below and/or is carried out using a magnetic actuator described above or below.

BRIEF DESCRIPTION OF THE DRAWINGS

Further exemplary details as well as exemplary embodiments are explained below with reference to the figures. Thereby shows FIG. 1 a schematic representation of a system with a magnetic actuator and a voltage source, FIG. 2 a diagram showing a temporal course of a coil current, FIG. 3 a schematic representation of a valve arrangement in a front view, and FIG. 4 a schematic representation of a valve arrangement in a side view.

DETAILED DESCRIPTION

Figure 1:
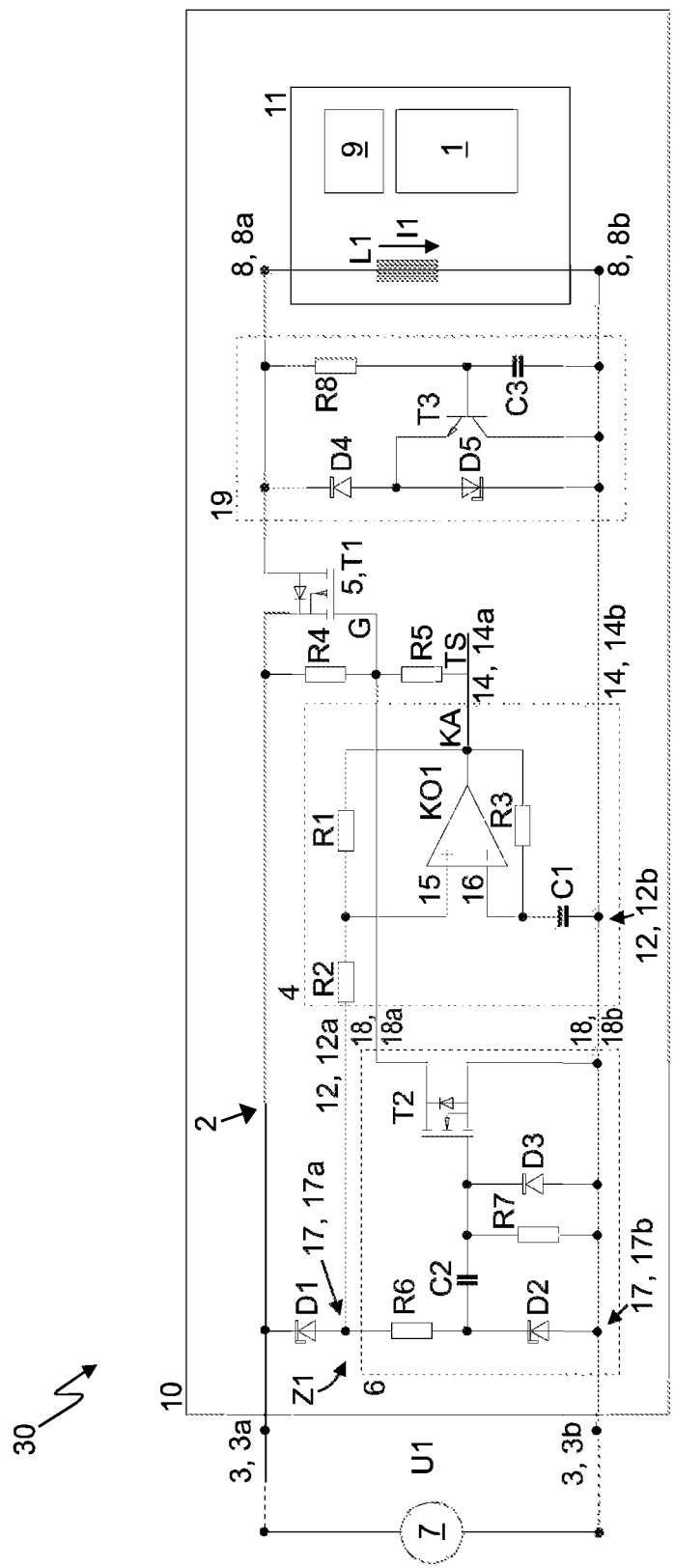

FIG. 1 shows a system 30 comprising a magnetic actuator 10 and a voltage source 7. The system 30 represents an exemplary application environment of the magnetic actuator 10. The magnetic actuator 10 can also be provided on its own, i.e. without the voltage source 7.

The magnetic actuator 10 is designed for use in automation technology, for example. Preferably, the magnetic actuator 10 is an industrial magnetic actuator. For example, an industrial plant is provided comprising the magnetic actuator 10.

The magnetic actuator 10 comprises an actuator element 1 and a coil L1 for actuating the actuator element 1. The actuator element 1 is expediently selectively movable into an attracted position and a non-attracted position. The actuator element 1 expediently comprises magnetic material, in particular ferromagnetic material, which interacts with a magnetic field provided by the coil L1. The actuator element 1 is displaceable from the non-attracted position to the attracted position by energizing the coil L1. The actuator element 1 can be held in the attracted position by energizing the coil L1. Expediently, in response to the coil L1 not being energized, the actuator element 1 assumes the non-attracted position. For example, the magnetic actuator 10 comprises a spring element 9 whose spring force moves the actuator element 1 to the non-energized position in response to the coil L1 not being energized.

Exemplarily, the magnetic actuator 10 comprises a magnetic actuator section 11 comprising the coil L1, the actuator element 1 and/or the spring element 9.

The magnetic actuator 10 comprises a circuit 2 for energizing the coil L1. Preferably, the circuit 2 is implemented exclusively in analog circuit technology. Expediently, the circuit 2 is purely analog. In particular, the circuit 2 does not comprise a microcontroller.

The circuit 2 has a supply voltage input 3 to which a supply voltage U1 can be applied. The supply voltage U1 is provided by the voltage source 7. The supply voltage U1 is used for energizing the coil L1. Expediently, the electrical energy required for energizing the coil L1 is provided by the supply voltage U1. Exemplarily, the coil L1 can be electrically connected to the supply voltage input 3 via a switch 5 of the circuit 2.

In a conducting state of the switch 5, a voltage drops across the coil L1, which shall be referred to as coil voltage. The coil voltage expediently behaves in accordance with the supply voltage U1 and results in particular as the difference between the supply voltage U1 and a switch voltage dropping across the switch 5. In a conducting state of the switch 5, a change in the supply voltage U1 causes a corresponding change in the coil voltage.

The supply voltage input 3 has, for example, a first input connection point 3a and a second input connection point 3b, between which the supply voltage U1 can be applied. In operation, the voltage source 7 is expediently connected between the first input connection point 3a and the second input connection point 3b and provides the supply voltage U1 between these two input connection points 3a, 3b.

The circuit 2 has an output 8 at which the coil voltage is provided. The output 8 comprises a first output connection point 8a and a second output connection point 8b, between which the coil L1 is connected. Exemplarily, the first output connection point 8a is electrically connectable to the first input connection point 3a via the switch 5, in particular directly electrically connectable. Exemplarily, the second output connection point 8b is electrically connectable, in particular directly electrically connectable, to the second input connection point 3b. For example, the second output connection point 8b is at the same electrical potential, for example at a ground potential, as the second input connection point 3b.

The circuit 2 is configured to provide a clocked energization of the coil L1 in a holding current reduction phase HP. When the coil L1 is energized, the current I1, which shall also be referred to as the coil current, flows through the coil L1. In particular, a clocked energization means that the circuit 2 periodically switches off or periodically reduces the current I1. Exemplarily, a clocked energization means that the circuit 2 periodically switches off the coil voltage, in particular by the circuit 2 periodically setting the switch 5 to a non-conducting state. By the clocking of the energization is meant in particular a clocking of the coil voltage. Preferably, during the clocked energization, the circuit 2 alternately provides an on phase and an off phase, wherein in the on phase the coil voltage is provided (for example by means of the conducting state of the switch 5) and in the off phase the coil voltage is switched off (for example by means of the non-conducting state of the switch 5). Expediently, this results in a plurality of successive periods, each period comprising an on phase and an off phase. The periods may be referred to as energization periods. Preferably, the circuit 2 provides the coil voltage as a PWM signal.

The circuit 2 is configured to adapt, in the holding current reduction phase, a duty cycle of the clocked current as a function of the supply voltage U1. In particular, the duty cycle is the duty cycle of the coil voltage (in particular present as a PWM signal). Preferably, the duty cycle is the result of dividing the duration of an on phase by the duration of a period of the coil voltage (in particular present as a PWM signal).

In the following, it shall be discussed in more detail how the circuit adjusts the duty cycle in the holding current reduction phase HP.

In particular, the circuit 2 maps the supply voltage U1 to the duty cycle in the holding current reduction phase HP. Preferably, the circuit 2 adjusts the duty cycle in the holding current reduction phase by the circuit 2 performing an open-loop control (and in particular no closed-loop control) of the duty cycle based on the supply voltage U1. In particular, the circuit 2 (especially in the holding current reduction phase) does not perform any closed-loop control of the current I1 flowing through the coil L1.

Preferably, the circuit 2 is configured to reduce or prevent, via the adjustment of the duty cycle, a change in a time average value of the current I1 flowing through the coil L1 when the supply voltage U1 changes. Expediently, the circuit 2 is configured to reduce or prevent an influence of a permanently increased or permanently decreased supply voltage U1 on the time average value of the current I1, namely via the duty cycle adjustment. In particular, the circuit 2 enables the magnetic actuator 10 to be operated with different operating voltages (as supply voltage U1), in particular within a permissible range of values, and at each of these operating voltages the clocked energization in the holding current reduction phase HP is sufficient to hold the actuator element 1 in the attracted position.

In particular, the circuit 2 is configured to counteract, preferably compensate for, by adjusting the duty cycle, a change in the time average value, which would be caused by a change in the supply voltage U1 without adjusting the duty cycle. In a preferred embodiment, by adjusting the duty cycle, the circuit 2 keeps the time average value of the current I1 constant even if the supply voltage U1 (and thereby the coil voltage) changes. In particular, the time average value is an average value of the coil current over a plurality of periods of the coil voltage.

The peak value of the coil voltage expediently changes in the same direction as the supply voltage U1. When the supply voltage U1 is increased, the peak value of the coil voltage increases and when the supply voltage U1 is decreased, the peak value of the coil voltage decreases.

Preferably, the circuit 2 is configured to increase the duty cycle in response to the supply voltage U1 decreasing and/or to decrease the duty cycle in response to the supply voltage U1 increasing.

Exemplarily, the circuit 2 achieves the clocking of the energization of the coil L1 by the circuit 2 controlling the switch 5 according to a clock signal TS. The switch 5 comprises a control terminal G which is controlled on the basis of the clock signal TS.

The clock signal TS is preferably a PWM signal. The circuit 2 is configured to adjust the duty cycle of the clock signal TS, thereby causing the duty cycle of the clocked current to be adjusted.

Preferably, the circuit 2 comprises a voltage divider connected in parallel to the supply voltage input 3. The voltage divider is exemplarily arranged in a first circuit branch Z1 or is formed by the first circuit branch Z1. The voltage divider is configured to provide an intermediate voltage. The intermediate voltage is a partial voltage of a voltage applied across the voltage divider, for example the supply voltage U1. The circuit 2 is configured to adjust, in the holding current reduction phase HP, the duty cycle based on the intermediate voltage.

Exemplarily, the voltage divider comprises a non-linear component having a non-linear current-voltage characteristic curve. Preferably, the non-linear current-voltage characteristic curve is such that the voltage that drops across the non-linear component, assuming a minimum current, is independent or at least largely independent of the current flowing through the non-linear component. The non-linear component is in particular a diode, preferably a Z-diode operated in reverse, for example the first diode D1, and/or in particular not a resistor. Preferably, the non-linear component is a semiconductor element. Expediently, the intermediate voltage can be tapped at a connection point of the non-linear component, for example at the anode of the first diode D1. The voltage divider expediently provides the intermediate voltage between a connection point of the non-linear component and a reference potential.

Preferably, the circuit 2 does not comprise a current measuring resistor for measuring the current I1 flowing through the coil L1.

Preferably, the circuit 2 includes a clock signal generation section 4. The clock signal generation section 4 is used to generate the clock signal TS which is used to clock the energization of the coil L1 to provide the clocked energization. Preferably, the clock signal generation section 4 is implemented exclusively in analog circuit technology.

The clock signal generation section 4 has a generation section input 12 with a first input connection point 12a and a second input connection point 12b. At the input 12—i.e. between the first input connection point 12a and the second input connection point 12b—an input voltage is applied which depends (in particular directly) on the supply voltage U1. Exemplarily, the input voltage is a partial voltage of the supply voltage U1.

The first input connection point 12a of the clock signal generation section 4 is connected to a first circuit branch Z1 of the circuit 2, in particular directly. The first circuit branch Z1 is connected between the first input connection point 3a and the second input connection point 3b of the input 3 of the circuit 2.

Exemplarily, the first input connection point 12a is connected to the first input connection point 3a via a first diode D1. The first diode D1 is designed in particular as a Z-diode. The circuit 2 is configured to pass on a change, in particular a fluctuation, of the supply voltage U1 to the input voltage of the generation section input 12, exemplarily via the first diode D1.

The second input connection point 12b of the clock signal generation section 4 is connected to the second input connection point 3b, in particular directly.

The clock signal generation section 4 includes a generation section output 14 having a first output connection point 14a and a second output connection point 14b. The clock signal generation section 4 is adapted to output the clock signal TS at the first output connection point 14a.

The first output connection point 14a is electrically connected to the control terminal G of the switch 5, exemplarily via a fifth resistor R5.

Exemplarily, the second output connection point 14b is at the same electrical potential as the second input connection point 12b.

Preferably, the clock signal generation section 4 comprises a comparator KO1, which is exemplarily designed as an operational amplifier. The comparator KO1 provides the clock signal TS at its comparator output KA. Exemplarily, the comparator output KA is the first output connection point 14a of the generation section output 14.

The comparator KO1 has a non-inverting input 15 and an inverting input 16, for example. The non-inverting input 15 is electrically connected to the first input connection point 12a, for example via a second resistor R2. The inverting input 16 is electrically connected to the second input connection point 12b, exemplarily via a first capacitor C1.

Preferably, the clock signal generation section 4 comprises a positive feedback path for the comparator KO1. Exemplarily, the positive feedback path runs from the comparator output KA to the non-inverting input 15, exemplarily via a first resistor R1.

Preferably, the clock signal generation section 4 comprises a negative feedback path for the comparator KO1. Exemplarily, the negative feedback path runs from the comparator output KA to the inverting input 16, exemplarily via a third resistor R3.

Preferably, the clock signal generation section 4 defines a hysteresis for the comparator KO1. Exemplarily, the hysteresis is defined by the first resistor R1.

Exemplarily, the clock signal generation section 4 includes an RC path extending from the comparator output KA to the second input connection point 12b. The RC path passes through the third resistor R3 and the first capacitor C1. The third resistor R3 is connected between the comparator output KA and the inverting input 16.

The comparator KO1 outputs at its comparator output KA the clock signal TS as a PWM signal whose duty cycle is determined by the input voltage applied to the generation section input 12. When the input voltage increases, the duty cycle increases and when the input voltage decreases, the duty cycle decreases.

The circuit 2 comprises the switch 5. The switch 5 is, for example, a first transistor T1. Via the switch 5, the coil L1 is electrically connectable to the supply voltage input 3 in order to energize the coil L1. The circuit 2 is designed to control the switch 5 on the basis of the clock signal TS in order to provide the clocked energization of the coil L1.

Preferably, the switch 5 is configured as an inverting switch, in particular as a p-channel MOSFET. In particular, a high level at the control terminal G causes the switch 5 to assume a non-conducting state, and a low level at the control terminal G causes the switch 5 to assume a conducting state.

Preferably, the circuit 2 is configured to reduce the duty cycle of the clock signal TS in response to the supply voltage U1 decreasing to cause an increase in the duty cycle of the coil voltage, and/or to increase the duty cycle of the clock signal TS in response to the supply voltage U1 increasing to cause a reduction in the duty cycle of the coil voltage.

Preferably, the magnetic actuator 10 comprises a timing element 6 which defines an attraction phase AP. The circuit 2 is configured to provide a particularly non-clocked attraction energization to the coil L1 in the attraction phase AP in order to move the actuator element 1 into the attracted position. The circuit 2 is further configured to provide, after the end of the attraction phase AP (in the holding current reduction phase HP), the clocked energization of the coil L1 in order to hold the actuator element 1 in the attracted position.

Preferably, the circuit 2 has the first circuit branch Z1 connected in parallel with the supply voltage input 3. The first diode D1 and the timing element 6 are arranged in the first circuit branch Z1. The clock signal generation section 4 is connected to the supply voltage input 3 via the first diode D1.

The timing element 6 has a timing element input 17 with a first input connection point 17a and a second input connection point 17b. Exemplarily, the timing element input 17 is arranged in the first circuit branch Z1, and in particular in series with the first diode D1. The first input connection point 17a is connected to the anode of the first diode D1 and to the first input connection point 12a of the generation section input 12. The second input connection point 17b is connected to the second input connection point 3b of the supply voltage input 3.

The timing element 6 includes a sixth resistor R6 and a second diode D2 connected in series between the first input connection point 17a and the second input connection point 17b. The second diode D2 has its cathode connected to the sixth resistor R6. In particular, the second diode D2 is designed as a Z diode and is preferably operated in the reverse direction.

The timing element 6 further comprises a second capacitor C2 and a second transistor T2. The second transistor T2 is exemplarily designed as an n-channel MOSFET. The second capacitor C2 is connected between the cathode of the second diode D2 and a gate terminal of the second transistor T2.

The timing element 6 further comprises a seventh resistor R7 connected between the gate terminal and the second input connection point 17b, and a third diode D3 connected in parallel with the seventh resistor R7.

The timing element 6 includes a timing element output 18 having a first output connection point 18a and a second output connection point 18b. The first output connection point 18a is exemplarily the drain connection of the second transistor T2. The first output connection point 18a is exemplarily connected to the control terminal G of the switch 5. The second output connection point 18b is exemplarily the source terminal of the second transistor T2. The second output connection point 18b is exemplarily connected to the second input connection point 12b of the generation section input 12.

The timing element 6 is designed to provide a low level at the first output connection point 18a for a predetermined time duration (during the attraction phase AP) in response to application of the supply voltage U1 to the supply voltage input 3—i.e. in particular in response to a change from a low level to a high level taking place at the first input connection point 3b—and to provide a high level after the predetermined time duration has elapsed. The predetermined time duration is the time duration of the attraction phase AP and may also be referred to as the attraction phase time duration. The low level provided in the attraction phase AP causes the switch 5 to assume the conducting state in the attraction phase AP (in particular continuously during the entire attraction phase AP), so that the coil L1 is energized, namely in particular continuously.

Exemplarily, the second transistor T2 is conducting during the attraction phase and non-conducting after the attraction phase has elapsed.

Figure 2:
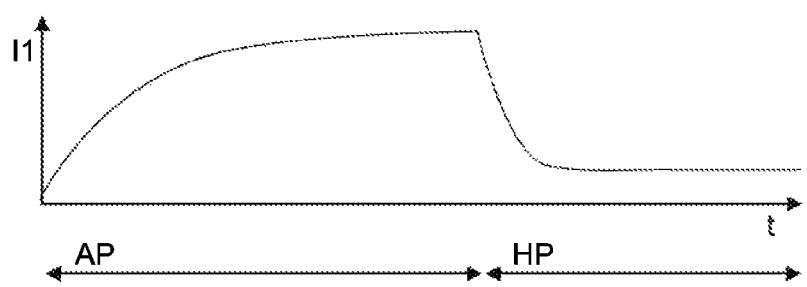

FIG. 2 shows the coil current I1 as a function of time. In the attraction phase AP, the coil current I1 increases monotonically as an example. In particular, the temporal course of the coil current I1 in the attraction phase AP has the form of limited growth.

After the end of the attraction phase AP, in particular immediately after the end of the attraction phase AP, the circuit 2 enters the holding current reduction phase HP. In the holding current reduction phase, the coil current I1 is reduced compared to the maximum value of the coil current I1 in the attraction phase AP.

In the holding current reduction phase HP, the second transistor T2 is non-conducting so that the potential of the control terminal G is determined by the clock signal TS. Accordingly, in the holding current reduction phase HP, the switch 5 is alternately set to the conducting state and the non-conducting state in order to reduce the time average value of the coil current I1 compared to the attraction phase.

Preferably, the circuit 2 includes a fourth resistor R4 connected between the first input connection point 3a of the supply voltage input 3 and the control terminal G. The fourth resistor R4 is used to cause the control terminal G to be pulled up to the high level (when the control terminal G is not pulled down to the low level via the second transistor T2 or the clock signal TS). In particular, the fourth resistor R4 is a pull-up resistor for the control terminal G.

Preferably, the circuit 2 comprises the fifth resistor R5. Exemplarily, the fifth resistor R5 is used to prevent the comparator output KA from being short-circuited when the second transistor T2 is set to the conducting state.

The circuit 2 further comprises a freewheeling circuit 19. The freewheeling circuit 19 is connected in parallel with the coil L1. The freewheeling circuit 19 serves to avoid voltage peaks. The freewheeling circuit 19 is designed to dissipate the energy of the coil L1 the faster the higher the coil voltage is. The freewheeling circuit 19 is also designed to dissipate the energy of the coil L1 more slowly in the holding current reduction phase HP—i.e. in particular during PWM operation of the switch 5—than in an off state, which exists when the supply voltage U1 is switched off.

The freewheeling circuit 19 comprises a fourth diode D4, a fifth diode D5 and a third transistor T3, which is exemplarily designed as a bipolar transistor, in particular as an NPN transistor. The fourth diode D4 has its cathode connected to the first output connection point 8a and its anode connected to the anode of the fifth diode D5. The fifth diode D5 has its cathode connected to the second output connection point 8b. The third transistor T3 is connected with its emitter to the anode of the fourth diode D4 and with its collector to the second output connection point 8b.

The freewheeling circuit 19 further includes an eighth resistor R8 connected between the first output connection point 8a and the base of the transistor T3, and a third capacitor C3 connected between the base of the transistor T3 and the second output connection point 8b.

Preferably, the magnetic actuator 10 is used in a valve arrangement 20, for example to actuate a pilot valve.

Figure 3:
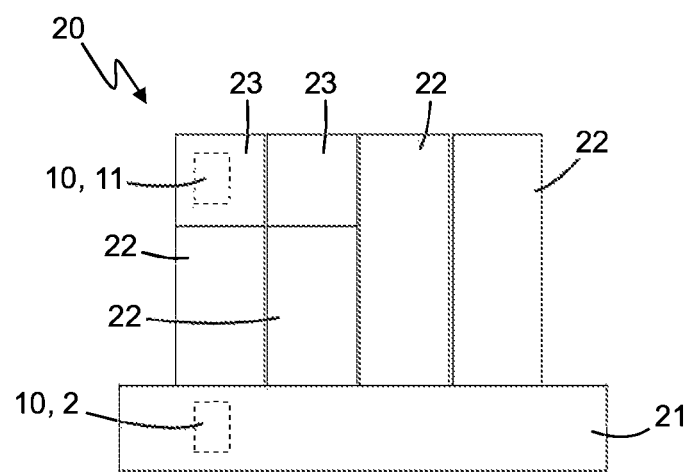
Figure 4:
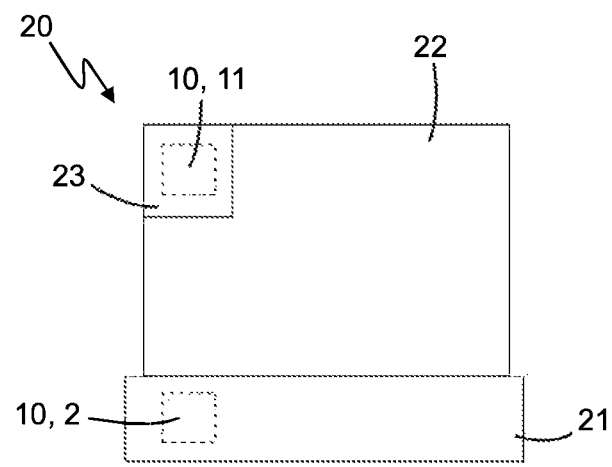

FIG. 3 shows an exemplary embodiment of a valve arrangement 20 in a front view. FIG. 4 shows a side view of the valve arrangement 20.

The valve arrangement 20 comprises the magnetic actuator 10. The actuator element 1 is designed as a valve member or serves to actuate a valve member of the valve arrangement 20.

In an exemplary embodiment, the valve arrangement 20 comprises a carrier section 21, which is configured as a carrier plate, for example, and a plurality of valve modules 22 arranged side by side on the carrier section 21.

Exemplarily, the circuit 2 is arranged in the carrier section 21. Exemplarily, the magnetic actuator section 11 is arranged in a valve module 22. In a purely exemplary manner, the valve module 22 comprises a pilot section 23, which is implemented as a submodule of the valve module 22, for example. The magnetic actuator section 11 is arranged in the pilot section 23 in an exemplary manner.

According to an embodiment not shown, the circuit 2 is arranged in the valve module 22, in particular in the pilot section 23.

What is claimed is:

1. A magnetic actuator having an actuator element, a coil for actuating the actuator element, and a circuit for energizing the coil, the circuit having a supply voltage input to which a supply voltage is applicable for energizing the coil, and the circuit being configured to provide, during a holding current reduction phase, a clocked energization of the coil,
wherein the circuit comprises a voltage divider connected in parallel to the supply voltage input and configured to provide an intermediate voltage, and wherein the circuit is configured to adjust, during the holding current reduction phase, the duty cycle based on the intermediate voltage, and
wherein the voltage divider comprises a first diode.

2. The magnetic actuator according to claim 1, wherein the circuit is configured, when the supply voltage changes, to reduce or prevent, via the adjustment of the duty cycle, a change in a time average value of a current flowing through the coil.

3. The magnetic actuator according to claim 1, wherein the circuit is configured to increase the duty cycle in response to the supply voltage decreasing and/or to decrease the duty cycle in response to the supply voltage increasing.

4. The magnetic actuator according to claim 1, wherein the circuit comprises a clock signal generation section for generating a clock signal used to clock the energization of the coil to provide the clocked energization.

5. The magnetic actuator according to claim 4, wherein the circuit comprises a switch via which the coil is electrically connectable to the supply voltage input for energizing the coil, and the circuit is configured to control the switch on the basis of the clock signal in order to provide the clocked energization of the coil.

6. The magnetic actuator according to claim 5, wherein the switch is a first transistor.

7. The magnetic actuator according to claim 4, wherein the clock signal generation section comprises a comparator which provides the clock signal at its comparator output.

8. The magnetic actuator according to claim 7, wherein the clock signal generation section comprises a positive feedback path for the comparator.

9. The magnetic actuator according to claim 7, wherein the clock signal generation section defines a hysteresis for the comparator.

10. The magnetic actuator according to claim 1, further comprising a timing element defining an attraction phase, wherein the circuit is configured to provide in the attraction phase a non-clocked attraction energization of the coil, in order to move the actuator element into an attracted position, and after the end of the attraction phase to provide the clocked energization of the coil in order to hold the actuator element in the attracted position.

11. The magnetic actuator according to claim 10, wherein the circuit comprises a clock signal generation section for generating a clock signal used to clock the energization of the coil to provide the clocked energization, wherein the circuit has a first circuit branch connected in parallel to the supply voltage input, wherein the first circuit branch comprises a first diode and the timing element, and the clock signal generation section is connected to the supply voltage input via the first diode.

12. A valve arrangement comprising a magnetic actuator having an actuator element, a coil for actuating the actuator element, and a circuit for energizing the coil, the circuit having a supply voltage input to which a supply voltage is applicable for energizing the coil, and the circuit being configured to provide, during a holding current reduction phase, a clocked energization of the coil and to adapt a duty cycle of the clocked energization as a function of the supply voltage, wherein the actuator element is designed as a valve member or serves to actuate a valve member of the valve arrangement, and
wherein the magnetic actuator further comprises a timing element defining an attraction phase, wherein the circuit is configured to provide during the attraction phase a non-clocked attraction energization of the coil, in order to move the actuator element into an attracted position, and after the end of the attraction phase to provide the clocked energization of the coil in order to hold the actuator element in the attracted position, and
wherein the circuit comprises a clock signal generation section for generating a clock signal used to clock the energization of the coil to provide the clocked energization, wherein the circuit has a first circuit branch connected in parallel to the supply voltage input, wherein the first circuit branch comprises a first diode and the timing element, and the clock signal generation section is connected to the supply voltage input via the first diode.

13. The magnetic actuator according to claim 12, wherein the circuit comprises a voltage divider connected in parallel to the supply voltage input and configured to provide an intermediate voltage, and wherein the circuit is configured to adjust, in the holding current reduction phase, the duty cycle based on the intermediate voltage.

14. The magnetic actuator according to claim 13, wherein the voltage divider comprises a first diode.

15. The valve arrangement according to claim 12, comprising a carrier section and a plurality of valve modules disposed side-by-side on the carrier section, wherein the circuit is disposed in a valve module or in the carrier section.

16. A method of operating a magnetic actuator having an actuator element, a coil for actuating the actuator element, and a circuit for energizing the coil, the circuit having a supply voltage input, wherein the circuit comprises a voltage divider connected in parallel to the supply voltage input, wherein the voltage divider comprises a first diode, the method comprising the steps of:
applying, to the supply voltage input, a supply voltage for energizing the coil;
the voltage divider providing an intermediate voltage;

during a holding current reduction phase, providing a clocked energization of the coil by means of the circuit; and during the holding current reduction phase, the circuit adjusting a duty cycle of the clocked current circuit based on the intermediate voltage.

* * * * *